Figure 1:
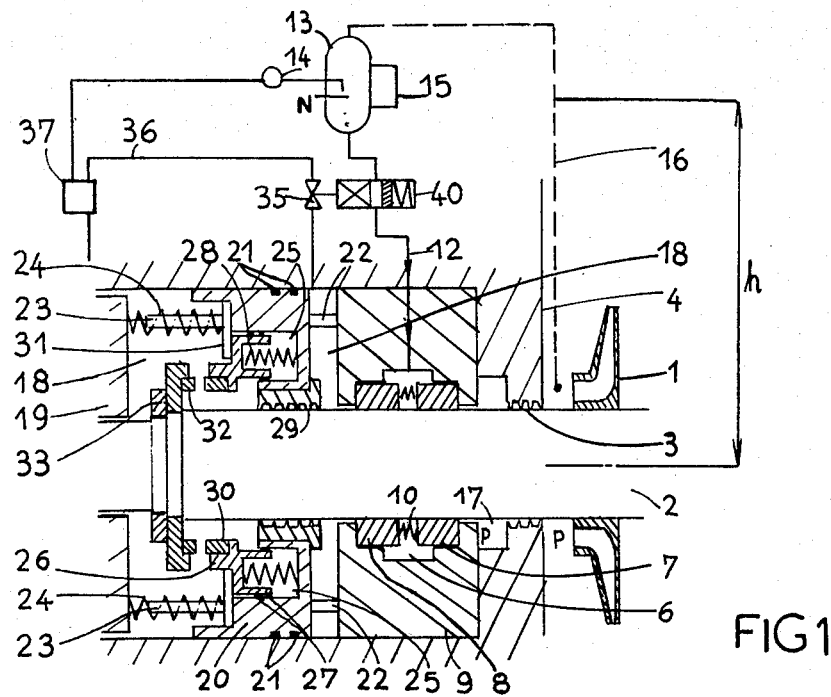

United States Patent [19]

Dousse et al.

[11] 3,994,503
[45] Nov. 30, 1976

[54] SEALING ASSEMBLY

[75] Inventors: Georges Dousse, Le Creusot; Jean-Paul Etheimer, Le Breuil, both of France

[73] Assignee: Creusot-Loire, Paris, France

[22] Filed: Oct. 23, 1975

[21] Appl. No.: 625,155

[30] Foreign Application Priority Data
July 11, 1975 France .......................... 75.21983

[52] U.S. Cl. ............................................ 277/3; 277/27
[51] Int. Cl.$^2$ ........................ F16J 15/34; F16J 15/46
[58] Field of Search ........................... 277/3, 15, 27

[56] References Cited
UNITED STATES PATENTS

| | | | |
|---|---|---|---|
| 2,984,507 | 5/1961 | Welch | 277/27 |
| 3,176,996 | 4/1965 | Barnett | 277/15 |
| 3,235,269 | 2/1966 | Olesen | 277/15 |
| 3,360,272 | 12/1967 | Blom et al. | 277/27 |
| 3,403,915 | 10/1968 | Roberts | 277/3 |
| 3,529,835 | 9/1970 | Lewis | 277/27 |
| 3,888,495 | 6/1975 | Mayer | 277/3 |

Primary Examiner—Robert I. Smith
Attorney, Agent, or Firm—Haseltine, Lake & Waters

[57] ABSTRACT

An assembly for sealing against the escape of gas round a rotary shift where it exits from apparatus containing gas under pressure, such as a compressor, comprising an oil (or other sealing liquid) film seal means arranged where said shaft exits from the body of the apparatus and comprising an annular chamber surrounding said shaft and to be supplied with oil at a pressure above that of said gas in said apparatus, said annular chamber being axially closed by two axially spaced annular elements mounted on said shaft with radial clearance to provide a passage for oil to flow from said chamber between said annular elements and said shaft, and sealing means for preventing escape of gas in the event of a failure of the supply of oil to said annular chamber or stoppage of said apparatus and comprising an outer chamber, an annular piston in said outer chamber in engagement with said shaft through a labyrinth seal, and first and second seals, said first seal being connected with said piston and said second seal being fixed on said shaft, said seals being arranged so that they contact each other when the piston is moved in said one direction under the pressure of oil in said part of said outer chamber and are spaced apart when said piston is moved in said opposite direction under the action of said resilient means, closure of said closure valve being effected following failure of said oil supply or stoppage of said apparatus.

4 Claims, 2 Drawing Figures

SEALING ASSEMBLY

The invention relates to an assembly for sealing a rotary shaft against escape of gas where the shaft exits from apparatus containing gas, e.g. a centrifugal compressor. In compressors used for pumping and compression of gas, particularly toxic or inflammable gases, devices must be provided for peventing escape of gas in the compressor where the rotary shaft of the compressor leaves the body of the compressor in order to be connected, for example, to the driving motor.

The seals employed for these shaft exits are usually of oil-film type and give satisfaction during normal running of the compressor. These seals generally comprise an annular chamber receiving oil at a pressure higher than that of the gas in the compressor and two floating rings surrounding the shaft on each side at its outlet from the oil-chamber. These are mounted with a clearance round the rotary shaft of the compressor to enable oil to flow through the clearance between the rings and the shaft, thereby ensuring sealing against gas at the exit of the shaft from the compressor.

However, in the event of a lack of sealing oil the gas may escape around the shaft, which presents very serious disadvantages in the case of toxic or inflammable gases. When that occurs the compressor is isolated by means of valves and depressurized. In the event of stopping of the compressor due to faulty operation of the oil feed circuit to the oil-film seal or in the event of accidental stopping of the compressor for any other reason sealing at the shaft exit from the compressor is no longer ensured.

It is an object of the invention to provide an assembly for sealing against escape of gas around a rotary shaft where said shaft exits from apparatus containing a gas under pressure, said assembly comprising:

sealing liquid film seal means arranged where said shaft exits from the body of said apparatus, said sealing liquid film seal means comprising: means defining an annular chamber surrounding said shaft and axially closed by two annular elements axially spaced apart and mounted on said shaft so as to leave a passage between said annular elements and said shaft for sealing liquid, and means for supplying sealing liquid to said annular chamber at a pressure higher than the pressure of said gas in said apparatus: and sealing means for preventing escape of gas in the event of lack of oil in said means for supplying sealing liquid to said annular chamber and arranged on that side of said sealing liquid film seal means remote from the exit of said shaft from said body of said apparatus, said sealing means comprising:

means integral with said body of said apparatus and defining an outer chamber which surrounds said shaft outwardly of said annular chamber and communicates at one end solely with said annular chamber through said passage between the adjacent one of said annular elements and said shaft and at its other end with the atmosphere, an annular piston in said outer chamber in engagement with said shaft through a labyrinth seal and in sealing engagement with the peripheral wall of said outer chamber, means for removing sealing liquid from the part of said outer chamber between said piston and said one end thereof including a closure valve, said piston being axially slidable in said outer chamber in one direction under the pressure of sealing liquid which will fill said part of the outer chamber when said closure valve is closed, and resilient means for moving said piston in said opposite direction, a first angularly fixed seal connected to said piston, and a second seal fixed to said shaft, said seals being arranged to contact each other during displacement of said piston in said one direction under the pressure of sealing liquid in said part of said outer chamber and will be spaced apart during return movement of said piston in said opposite direction under the action of said resilient means, closure of said closure valve being effected following faulty operation of said means for supplying sealing liquid to said annular chamber.

In order that the invention shall be more fully understood there will now be described, by way of example only and with reference to the accompanying drawings, a sealing assembly in accordance with the invention, associated with the end of the rotary shaft of a centrifugal compressor.

Figure 2:
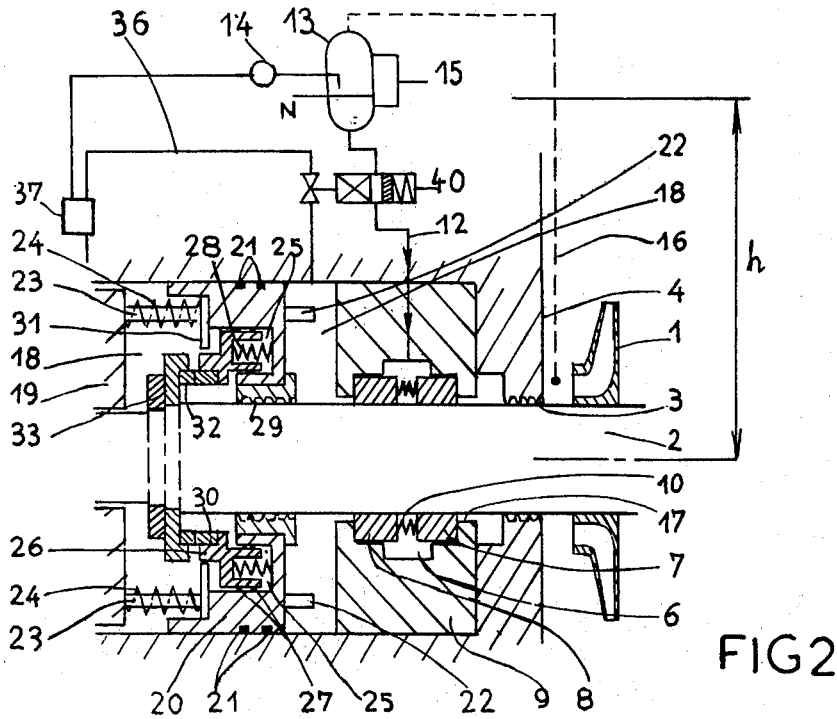

In the drawings:

FIG. 1 is an axial section through an assembly in accordance with the invention, associated with a compressor, the compressor being in service and sealing being ensured solely by the sealing liquid film seal; and FIG. 2 is an axial section of the assembly of FIG. 1 when the compressor is at standstill following faulty operation of the sealing liquid supply means.

There is shown in FIGS. 1 and 2 one end of a compressor 1 and one end of a rotary shaft 2 at its exit from the compressor 1. The rotary shaft 2 leaves the body of the compressor 4 by passing through a labyrinth seal 3. At its outlet from the compressor the shaft 2 is surrounded by an oil-film seal comprising an annular chamber 6 provided in a crown or annular body 9 and closed at each axial end by rings 7 and 8. The rings 7 and 8 are mounted on the shaft 2 with a small radial clearance to allow oil to flow between the rings and shaft 2. The ring 7 closer to the compressor is called the inner ring and the ring 8 closing the chamber 6 on that side adjacent the outer atmosphere is called the outer ring. A resilient device 10 maintains the faces of the rings 7 and 8 directed outwardly of the chamber 6 against the corresponding faces of the crown 9 so that contact between these surfaces which are carefully machined ensures sealing of the chamber 6.

The chamber 6 is fed with oil by way of a circuit comprising piping 12 and a tank 13 in which the oil is kept at constant level by a feed pump 14 and a level-regulating circit 15. The top portion of the tank 13 is connected by piping 16 to the interior of the compressor so as to maintain the space above the oil in the tank 13 at a pressure identical with that of gas in the compressor.

After passing through the oil seal the end of the shaft 2 passes through an outer cylindrical chamber 18 and comes to bear on a bearing 19 in which it is mounted to rotate. The chamber 18 may be arranged in the body of the compressor or in an independent part fixed rigidly onto the compressor body. A piston is slidably mounted inside this cylindrical chamber 18 in a sealed manner by packings 21. Sealing between the piston 20 and the shaft 2 is ensured at a labyrinth seal 29. On the piston 20 are fixed stop-rods 22 and 23 which stop relative movement of the piston by abutting against the crown 9 and the bearing 19 respectively. Springs 24 coaxial with the rods 23 enable the piston 20 to be returned from a position in which the rods 23 abut the bearing 19. In the piston 20 on that face thereof directed towards the outside of the compressor is arranged an annular chamber 25. A piston 26 is mounted in this chamber 25 in a sealed manner by packings 27, the piston 26 being biassed by springs 28. A ring 30 forming a seal is fixed to an outwardly directed face of the piston 26. The piston 20 carries a pusher 31 which is intended to bring about the return of the piston 26 and the sealing ring 30 rearwardly or inwardly of the compressor during the return movement of the piston 20. The rotary shaft 2 carries a bracket 33 which supports a ring 32 arranged opposite the ring 30 such that an axial movement of the ring 30 will bring it into contact with the ring 32. The ring 32 constitutes a seal the surface of which comes into contact with the ring 30, is carefully machined.

In FIG. 1 the various sealing parts are in the positions they occupy when the compressor is in normal operation. Under these conditions the shaft 2 is in rotation and the seal against escape of gas along the shaft 2 ensured by the oil-film seal in the following manner: the oil coming from the tank 13 flows through the piping 12 into the chamber 6: this oil is at a pressure higher than the pressure of the gas in the compressor because the top part of the tank 13 is at the pressure of this gas and the surface level of the oil in the tank 13 is at a height $h$ above the axis of the compressor. The oil in the chamber 6 is therefore at a pressure higher than the pressure in the chamber 18, which is atmospheric pressure, and higher than the pressure inside the compressor. The oil will therefore flow through the radial clearance between the rings 7 and 8 and the shaft 2 into a chamber 17 located towards the compressor and into the chamber 18 respectively. The oil flowing into the chamber 17 mixes with any gas in the chamber 17 from the interior of the compressor and the emulsion is exhausted to purgers.

The oil flowing into the chamber 18 flows therefrom by gravity to a tank 37 which is at atmospheric pressure by piping 36 provided with a valve 35 which, during normal running of the compressor, remains open. The oil received in the tank 37 is returned to the tank 13 by the pump 14 and contributes to maintaining a constant level of oil in the tank 13. During normal running of the compressor, the piston 20 is kept by the springs 24 in its rear or inward position in which the rods 22 abut the crown 9. In this position the sealing rings 30 and 32 are not in contact. The labyrinth seal 29, ensuring sealing between the piston 20 and the shaft 2, prevents escape of oil from the chamber 18 along the shaft 2.

In the event of failure of the pump 14 or any other damage to the oil feed circuit to the chamber 6, the oil drops in the tank 13. At a certain level below that shown in FIG. 1 an automatic contact-device (not shown) stops the compressor. Sealing at this instant is still ensured by the oil remaining in the receiver 13, which continues to flow through the piping 12 into the chamber 6 and between the rings 7 and 8 and the shaft 2.

In order to obtain a lasting seal against escape of gas from the compressor by the above described sealing assembly, it is sufficient to close the valve 35 in the sealing oil circuit 36. In fact closure of the valve 35 when there is oil still left in the piping 12 and in the tank 13 causes a rise of pressure in the part of the chamber 18 between the crown 9 and the rear or inwardly directed face of the piston 20. This rise of pressure in this part of the chamber 18 causes the piston 20 to move forwardly or outwardly since the opposite face of the piston 20 which is not in contact with the oil, is at atmospheric pressure. The effective area of the piston 20 is large in order that the force developed by the oil on the rear face of the piston is sufficient to cause detachment of the packings 21 whatever their state after a long period of normal operation of the compressor. Outward movement of the piston 20 continues until the rods 23 abut the support of the bearing 19. Before the piston 20 comes to a stop the seal 30 has come into contact the opposing seal 32.

Subsequent movement of the piston 20 causes movement of the piston 26 into the chamber 25 and compression of the springs 28. The large force exerted by the piston 20, because of its large effective area, also causes detachment of the packings 27 and the above described movement of the piston 26, even if the assembly has not operated for a long time, for example, several years. In the outward position of the piston 20, as shown in FIG. 2, the rings 30 and 32 are in contact and the contact pressure is ensured by the piston 26 biassed by the springs 28. It can be seen that the contact pressure between the seals 30 and 32 can thus be adjusted independently of the requirement of a large breakaway force for the piston 20, it being sufficient to select a suitable characteristic of the springs 28 in order to obtain a bearing pressure compatible with the material of the seals 30 and 32.

Closure of the valve 35 may be obtained manually after stopping of the compressor, an operator entrusted with supervision of the compressor closing this valve as soon as he has noted the stopping of the compressor. In this case the reverse of oil in the tank 13 provides for a certain delay for acting before gas will escape into the atmosphere.

Closure of the valve 35 may alternatively or additionally be obtained automatically as soon as the level of oil has dropped to a reference level. This automatic closure may, for example, be effected by a single-acting servomotor 40. When the piping 12 is empty of oil at the level of the servomotor 40 a spring closes the valve 35.

The seals 30 and 32, when in contact as shown in FIG. 2, constitute a barrier to the passage of oil and gas together with the purgers and the valve 35 which is closed. With the compressor at standstill and the valve 35 closed, the piston 20 is kept in its forward position by the pressure of the fluid contained in the chamber 18 even if the flow of oil continues, since gas in the compressor can flow from the compressor as far as the said part of chamber 18 and there from an emulsion with the oil. The fluid (oil or possibly emulsion) in the said part of chamber 18, the pressure of which is higher than atmospheric pressure, will therefore continue to ensure sealing by applying a pressure to the rear face of the piston 20. On the other hand flow of the gas towards the outside atmosphere will not be able to continue beyond the sealing rings 30 and 32 which are designed and applied against one another to prevent escape of gas therebetween. A prolonged stoppage of the compressor will therefore have no influence upon possible leaks of gas to atmosphere.

After repair, when feeding of the rings 7 and 8 with sealing oil is again possible, the valve 35 is opened which causes emptying of the part of the chamber 18 lying between the piston 20 and the crown 9. The pressure in this part of the chamber 18 then returns to atmospheric pressure and the resultant of the forces exerted on the piston 20 is reduced to zero. The springs 24 then bring the piston 20 back to its initial rearward position in which the rods 22 abut the crown 9 of the seal. The piston is thus returned to the position shown in FIG. 1 and during its rearward movement has carried with it the piston 26 because of the pusher 31, separating the seal 30 from the seal 32. The compressor may then be restarted.

The above described assembly has the advantage of employing only an oil-film seating device when the compressor is running, to the exclusion of any contact device, and an entirely static contact sealing device when the compressor is at standstill. This assembly has the advantage, whilst exerting only a moderate and adjustable force on the seals 30 and 32, of being able to exert a very large force at the start of the forward motion of the piston 20, which may be necessary in order to detach the piston 20 itself or to unlock the sealing piston 26 in the event of their having remained for a long period without operation, this causing hardening of the sealing packings 21, 27. In current industrial practice one must be able to be certain of the operation of the sealing assembly even in the event of stoppage of the compressor after long periods, e.g. several years, of continuous operation without incident.

The invention is not intended to be restricted to the assembly which has just been described, but on the contrary covers any variant or equivalent thereof or of a part thereof. Thus, while for convenience the sealing liquid employed in the chamber 6 and flowing between the rings 7 and 8 has been designated "oil", any other suitable liquid may be used. Additionally, while in the embodiment which has just been described, the chamber 6 is closed by rings having a radial clearance between them and the rotary shaft, it is equally possible to conceive of a liquid-film seal ensuring sealing of the compressor while in rotation, which employs for example labyrinth seals instead of rings. Also in the assembly which has just been described the seals 30 and 32 are not in contact when the compressor is in operation. It is, however, possible to conceive of seals which can come into contact when the compressor is still in rotation.

Finally, while the assembly in accordance with the invention is applicable mainly to centrifugal compressors, one can however conceive of applications of this assembly to other rotary machine containing a gas under pressure and of which a rotary shaft passes through a wall thereof.

What is claimed is:

1. An assembly for sealing against escape of gas around a rotary shaft where said shaft exits from apparatus containing a gas under pressure, said assembly comprising:

sealing liquid film seal means arranged where said shaft exits from the body of said apparatus, said sealing liquid film seal means comprising: means defining an annular chamber surrounding said shaft and axially closed by two annular elements axially spaced apart and mounted on said shaft so as to leave a passage between said annular elements and said shaft for sealing liquid, and means for supplying sealing liquid to said annular chamber at a pressure higher than the pressure of said gas in said apparatus: and sealing means for preventing escape of gas in the event of lack of oil in said means for supplying sealing liquid to said annular chamber and arranged on that side of said sealing liquid film seal means remote from the exit of said shaft from said body of said apparatus, said sealing means comprising:

means integral with said body of said apparatus and defining an outer chamber which surrounds said shaft outwardly of said annular chamber and communicates at one end solely with said annular chamber through said passage between the adjacent one of said annular elements and said shaft and at its other end with the atmosphere, an annular piston in said outer chamber in engagement with said shaft through a labyrinth seal and in sealing engagement with the peripheral wall of said outer chamber, means for removing sealing liquid from the part of said outer chamber between said piston and said one end thereof and including a closure valve, said piston being axially slidable in said outer chamber in one direction under the pressure of sealing liquid which will fill said part of the outer chamber when said closure valve is closed, and resilient means for moving said piston in said opposite direction, a first angularly fixed seal connected to said piston, and a second seal fixed to said shaft, said seals being arranged to contact each other during displacement of said piston in said one direction under the pressure of sealing liquid in said part of said outer chamber and will be spaced apart during return movement of said piston in said opposite direction under the action of said resilient means, closure of said closure valve being effected following faulty operation of said means for supplying sealing liquid to said annular chamber.

2. A sealing assembly as claimed in claim 1, wherein said first seal is connected to said piston by a sealing piston slidable in a chamber in that face of said first piston facing said other end of said chamber and said first piston in its position corresponding to contact between said seals is stopped against a fixed part, the application pressure of said seals against one another being produced by resilient means acting on said sealing piston independently of said first piston.

3. A sealing assembly as claimed in claim 1, wherein said closure valve is connected to an actuator device controlled by a servomotor in said means for supplying sealing liquid said annular chamber.

4. A sealing assembly as claimed in claim 2, wherein said closure valve is connected to an actuator device controlled by a servomotor in said means for supplying sealing liquid to said annular chamber.

* * * * *